(12) United States Patent
Touitou et al.

(10) Patent No.: US 12,032,679 B2
(45) Date of Patent: Jul. 9, 2024

(54) APPARATUS AND METHOD FOR DISK ATTESTATION

(71) Applicant: Huawei Cloud Computing Technologies Co., Ltd., Guizhou (CN)

(72) Inventors: Dan Touitou, Munich (DE); Avigail Oron, Hod Hasharon (IL); Naor Shlomo, Hod Hasharon (IL); Ayal Baron, Munich (DE)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 285 days.

(21) Appl. No.: 17/570,899

(22) Filed: Jan. 7, 2022

(65) Prior Publication Data

US 2022/0129544 A1    Apr. 28, 2022

Related U.S. Application Data

(63) Continuation of application No. PCT/EP2019/068705, filed on Jul. 11, 2019.

(51) Int. Cl.
*G06F 21/53* (2013.01)
*G06F 21/54* (2013.01)
*G06F 21/60* (2013.01)
*G06F 21/78* (2013.01)
*G06F 21/10* (2013.01)

(52) U.S. Cl.
CPC ............. *G06F 21/53* (2013.01); *G06F 21/54* (2013.01); *G06F 21/602* (2013.01); *G06F 21/78* (2013.01); *G06F 21/107* (2023.08)

(58) Field of Classification Search
CPC ........ G06F 21/53; G06F 21/54; G06F 21/602; G06F 21/78; G06F 21/107; G06F 21/64; G06F 21/57; H04L 9/3236; H04L 9/3247; H04L 63/0823; H04L 63/126
See application file for complete search history.

(56) References Cited

U.S. PATENT DOCUMENTS

| | | | |
|---|---|---|---|
| 9,092,161 B2* | 7/2015 | Baron | G06F 12/16 |
| 2012/0179904 A1* | 7/2012 | Dunn | G06F 21/575 |
| | | | 713/155 |
| 2015/0121536 A1* | 4/2015 | Xing | G06F 21/53 |
| | | | 726/26 |
| 2018/0096137 A1* | 4/2018 | Trostle | G06F 21/53 |
| 2018/0114012 A1* | 4/2018 | Sood | G06F 21/79 |
| 2018/0139044 A1* | 5/2018 | Lange | G06F 21/10 |
| 2019/0050247 A1* | 2/2019 | El-Moussa | G06F 21/53 |
| 2019/0065406 A1* | 2/2019 | Steiner | H04L 9/3271 |
| 2019/0132136 A1* | 5/2019 | Scarlata | H04L 9/0891 |
| 2019/0268308 A1* | 8/2019 | Sinha | H04L 63/0281 |
| 2020/0110886 A1* | 4/2020 | Moyer | H04L 9/0841 |
| 2021/0248268 A1* | 8/2021 | Ardhanari | G06F 21/53 |
| 2022/0014389 A1* | 1/2022 | Nix | H04L 9/006 |

* cited by examiner

*Primary Examiner* — J. Brant Murphy
(74) *Attorney, Agent, or Firm* — Conley Rose, P.C.

(57) ABSTRACT

In a method for software attestation, an enclave including an operating system (OS) library is initialized in a trusted execution environment, wherein software attestation is performed to verify an identity of the enclave, wherein an application is executed inside the enclave using the OS library, and wherein performing the software attestation includes attestation of a content of a disk image associated with the application.

20 Claims, 6 Drawing Sheets

APPARATUS AND METHOD FOR DISK ATTESTATION

CROSS-REFERENCE TO RELATED APPLICATIONS

This is a continuation of Int'l Patent App. No. PCT/EP2019/068705 filed on Jul. 11, 2019, which is incorporated by reference.

FIELD

The present disclosure relates to an apparatus and a method for software attestation, in particular disk attestation and disk sealing in distributed computing environments.

BACKGROUND

In the field of distributed computing environments, cloud computing is becoming increasingly important as a way to achieve more flexible, scalable, and efficient systems. However, as users of cloud computing services lose the direct control of their data and applications hosted by cloud providers, the trustworthiness of cloud services is a main issue that hinders the deployment of cloud applications.

To overcome reservations of users towards using cloud services, cloud/service providers offer so-called trusted services that ensure their users that the data and applications they provide to the service will remain secure and protected and that the service will use these assets only as expected by the users.

One example of a trusted service is a trusted cloud service that guarantees its customers that their applications will run in the cloud unmodified and protected even from the cloud provider who offers the service as infrastructure as a service (IaaS).

Trusted services can be developed using a trusted execution environment (TEE), such as Intel SGX. A TEE is a secure area of a processor that establishes an isolated execution environment that provides security features such as isolated execution, integrity of applications executing with the TEE, along with confidentiality of their assets.

A trusted execution environment such as Intel's Software Guard Extensions (SGX) ensures the application running in it the following properties: code immutability, meaning that the logic of the protected application cannot be altered; data confidentiality that ensures that the application cannot be accessed without authorization; and attestation, meaning that the protected application has the ability to prove its identity to a third party, i.e., that it is indeed a specific program running in the TEE. Thus, using TEE, the service provider can ensure that the users' assets will be protected and that the provided service will be able to attest its identity to the users.

A service identity is usually a large number, e.g. 256 bits that may be the result of a cryptographic hash on the service executable, i.e. the binary code of the application, or the entire application deployment including the individual components of the service and the topology. With Intel SGX, the identity of an application is a hash of the application, i.e. a hash of the executable and the initial state of the memory when the isolated execution environment or protected container, generally referred to as an enclave, is created and starts running.

Within Intel SGX, the above described protection is ensured only when the application is executed in user mode. System calls, for instance with regard to disk I/O, as well as exception and interrupt handling, however, invoke the operating system (OS) kernel which is generally untrusted. Furthermore, invoking OS functionality during the execution of the application requires special handling and comes at a relatively high price in execution performance. As a consequence, porting applications to Intel SGX requires some effort which limits the dissemination of Intel SGX despite its remarkable security benefits.

To simplify the process of porting applications to Intel SGX, the Linux Kernel Library (LKL) was ported to Intel SGX. LKL exposes operating system services to the application as a library. Within LKL, system call invocations are transformed into standard function calls. SGX-LKL, i.e. Intel SGX with ported LKL, executes the entire LKL inside an SGX enclave and consequently, any executable processed by LKL as well. The main benefit of SGX-LKL is that it allows running unmodified applications in SGX.

Despite its benefits, SGX-LKL has a number of security issues. By way of example, SGX-LKL attestation covers the LKL only but not the application being executed. As a result, a challenger cannot distinguish during the attestation process between the correct application and a rogue application being executed. Furthermore, disk content is generally not attested by SGX-LKL attestation. For applications running in interpreted languages such as Python, Java, etc., the behavior of the application does not only depend on the executable, i.e. the interpreter, but mostly on the data. In addition, application behavior is affected by configuration files. Finally, with SGX-LKL, disk content is not protected. Consequently, data on the disk can be exposed and/or altered.

One straightforward solution to the above-mentioned problems that has been proposed is to provide SGX-LKL with an encrypted disk. The encryption key is known only to the application owner. At the beginning of the execution, the SGX-LKL attests its identity to the owner and establishes a secure channel with him/her. The owner then provides the cryptographic key, such as a public key, which enables decryption of the disk and the program execution starts.

This solution has two main disadvantages:

First, it is prone to the following attack: an attacker starts SGX-LKL execution with the disk encrypted with his own key and provides the SGX-LKL enclave with the key. The SGX-LKL enclave starts executing a malware on the disk that alters the memory of the SGX-LKL enclave and changes its behavior. The SGX-LKL enclave which is now corrupted misleads the real application owner to believe that it is a freshly created instance of an SGX-LKL enclave.

Secondly, the solution assumes that there exists an entity, such as the owner of the application, who can provide the disk encryption key. Unfortunately, some applications, especially decentralized applications, do not have an owner but still have to prove their identity.

It is therefore desirable to provide a mechanism that blocks the above described attacks. In particular, the mechanism shall provide attestation that covers not only the executable but also the disk content. Finally, the disk content shall be sealed to prevent tampering with it, in particular in the case of distributed execution.

SUMMARY

The present disclosure provides an apparatus and a method for disk attestation and disk sealing in distributed computing environments. The extended attestation of the present disclosure includes the content of a disk associated with an application in addition to the executable of the application (including the LKL). In other words, during attestation, the SGX-LKL enclave of the present disclosure will be able to prove, in addition to the authenticity of the executable of the application, the authenticity of the content of the disk that the application is working with. The disk sealing according to the present disclosure ensures that only the disk image which is attested by the extended attestation will be used and that its content will remain protected.

According to one aspect of the present disclosure, an apparatus for software attestation is provided wherein the apparatus comprises a processing circuitry configured to: initialize an enclave in a TEE, wherein the enclave includes an OS library; perform software attestation to verify an identity of the enclave; and execute an application inside the enclave using the OS library; wherein performing the software attestation includes attestation of a content of a disk image associated with the application. The processing circuitry may, in particular, comprise a disk attestation unit configured to perform attestation of the content of the disk image associated with the application.

The content of the disk image may include at least one of an executable of the application, an interpreted program of the application, execution data of the application and a configuration file of the application.

According to a further aspect, the processing circuitry, in particular the disk attestation unit, may be further configured to add a public key or a cryptographic hash of the public key to a memory of the enclave before initializing the enclave. The processing circuitry, in particular the disk attestation unit, may be further configured to receive another public key as input to the enclave, wherein verifying the identity of the enclave includes verifying the received other public key or a cryptographic hash of the received other public key, calculated by the processing circuitry, in particular the disk attestation unit, against the respective public key or cryptographic hash of the public key added to the memory of the enclave. The processing circuitry, in particular the disk attestation unit, may be further configured to receive a cryptographic signature of the content of the disk image as input to the enclave, wherein verifying the identity of the enclave includes verifying the content of the disk image by using the public key and the cryptographic signature.

According to a further aspect, the processing circuitry, in particular the disk attestation unit, may be further configured to apply a cryptographic hash function to the content of the disk image and to add a resulting cryptographic hash to a memory of the enclave before initializing the enclave. Verifying the identity of the enclave may include verifying the content of the disk image by using the cryptographic hash.

According to a further aspect, the processing circuitry may be further configured to stop execution of the application upon failure of the verification of the identity of the enclave. To this end, the processing circuitry may include a disk sealing unit. The processing circuitry, in particular the disk sealing unit, may be further configured to generate a random encryption key, to read the disk image, and to create a duplicate of the disk image by encrypting the disk image with the random encryption key before executing the application. The processing circuitry, in particular the disk sealing unit, may be further configured to, upon successful verification of the identity of the enclave, encrypt the random encryption key using a key of the enclave, such as a sealing key of the enclave, and to add the encrypted random encryption key to the encrypted duplicate. The processing circuitry, in particular the disk sealing unit, may be further configured to redirect all disk access calls of the OS library during execution of the application to the encrypted duplicate.

According to another aspect of the present disclosure, a method for software attestation is provided, wherein the method comprises: initializing an enclave in a TEE, wherein the enclave includes an OS library; performing software attestation to verify an identity of the enclave; and executing an application inside the enclave using the OS library; wherein performing the software attestation includes attestation of a content of a disk image associated with the application.

The content of the disk image may include at least one of an executable of the application, an interpreted program of the application, execution data of the application and a configuration file of the application.

According to a further aspect, the method may further comprise adding a public key or a cryptographic hash of the public key to a memory of the enclave before initializing the enclave. The method may further comprise receiving another public key as input to the enclave and verifying the received other public key or a cryptographic hash of the received other public key against the respective public key or cryptographic hash of the public key added to the memory of the enclave to verify the identity of the enclave.

The method may further comprise receiving a cryptographic signature of the content of the disk image as input to the enclave and verifying the content of the disk image by using the public key and the cryptographic signature to verify the identity of the enclave.

According to a further aspect, the method may further comprise applying a cryptographic hash function to the content of the disk image and adding a resulting cryptographic hash to a memory of the enclave before initializing the enclave. The method may further comprise verifying the content of the disk image by using the cryptographic hash to verify the identity of the enclave.

The method may further comprise stopping execution of the application upon failure of the verification of the identity of the enclave.

According to a further aspect, the method may further comprise: generating a random encryption key; reading the disk image; and creating a duplicate of the disk image by encrypting the disk image with the random encryption key before executing the application. Upon successful verification of the identity of the enclave, the random encryption key may be encrypted using a key of the enclave, such as a sealing key of the enclave; and the encrypted random encryption key may be added to the encrypted duplicate. All disk access calls of the OS library during execution of the application may be redirected to the encrypted duplicate.

Furthermore, a computer-readable medium storing instructions that when executed on a processor cause the processor to perform any one of the above described methods is provided.

As mentioned above, the apparatus may include a dedicated disk attestation unit and/or a dedicated disk sealing unit configured to perform any one of the above-described methods. The disk attestation unit and/or the disk sealing unit may be implemented as one or more software modules or as separate units of the processing circuitry. The disk attestation unit and/or the disk sealing unit may be implemented as a combination of software and hardware. The described processing may be performed by a chip, such as a general-purpose processor, a CPU, a GPU, or a field-programmable gate array (FPGA), or the like. However, the present disclosure is not limited to implementation of the disk attestation unit and/or the disk sealing unit on programmable hardware. The units may also be implemented on an application-specific integrated circuit (ASIC) or by a combination of the above-mentioned hardware components.

BRIEF DESCRIPTION OF THE DRAWINGS

In the following, exemplary embodiments are described in more detail with reference to the attached figures and drawings, in which.

DETAILED DESCRIPTION

The present disclosure relates to the general technical field of authentication of remote services such as cloud computing, software as a service (SaaS), IaaS, and remote computation. It extends existing mechanisms for attesting the identity of a remote application by adding attestation of the disk content associated with the remote application and disk sealing to maintain confidentiality and integrity of the disk content.

Figure 1:
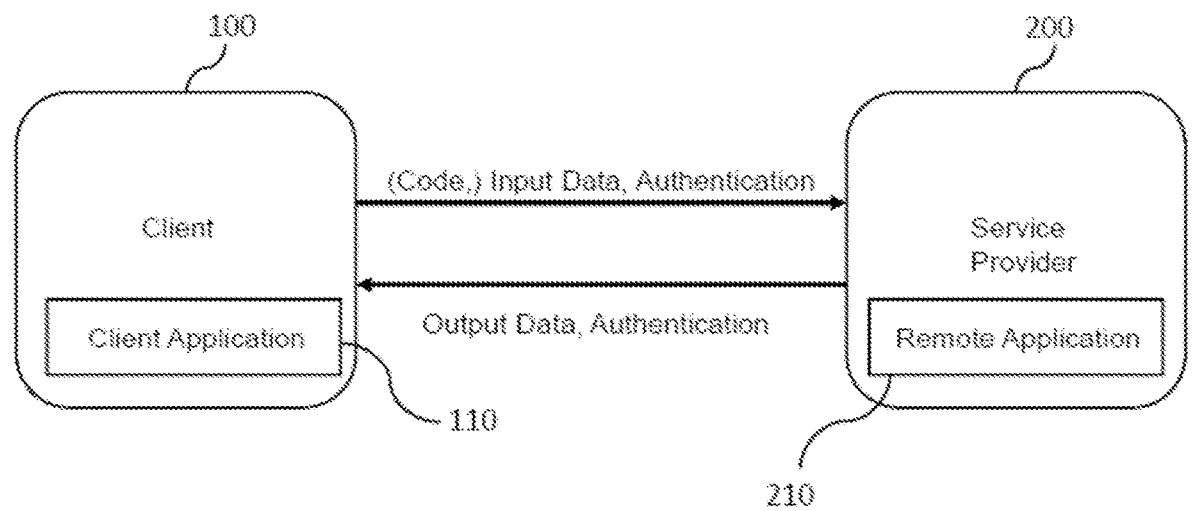
FIG. 1 schematically shows a general client-server configuration for remote services such as remote computation.

A general client-server architecture for remote services is schematically illustrated in FIG. 1. The configuration includes one or more clients 100 that communicate with one or more servers 200. A client may be implemented in a user device or client device as described below. A server may be implemented in a server device provided by a service provider and/or a cloud provider. The present disclosure is, however, not limited to these specific implementations but may be applied to any configuration wherein a local client (device) requests a service from a remote server (device) that is provided to the client by the server. It is understood that the service may be provided by more than a single server or server device, but may itself rely on a distributed system architecture. The server may include for instance, a web server as a front end, an application server and a data base server. For simplicity, the remote entity providing the service, whether a single server or server device, a distributed or micro service based system, or the like will be referred to in the following as a service provider. Furthermore, the client is not limited to a single client or client device but may itself include a distributed system. The client may further act as a server itself in a distributed environment, for instance as an intermediary server. The term client is used herein to include any of the above-mentioned architectures and merely indicates that entity 100, e.g. a client device, receives a service from a remote entity 200, e.g. a server device. With regard to other aspects than the provision and reception of the remote service, the client 100 and the server 200 may even switch roles.

The client 100 and the service provider 200 may be operatively connected to one or more respective client data stores and server data stores (not shown) that can be employed to store information local to the respective client 100 and server 200, such as application code, application data, input data, output data, authentication data, and the like.

The client 100 and the service provider 200 may communicate information between each other using a communication framework as indicated by the arrows. The information may include authentication information such as keys and/or signatures for establishing a secure communication channel, one or more applications, e.g. as code or binaries, input data and/or configuration data for execution of the remote application, output data of the remote application, and the like. The information may further include keys and/or signatures for software attestation as described below. Furthermore, applications may be provided as interpreted code to be executed by an interpreter.

In an IaaS architecture, the remote application may be provided by the client 100 and communicated to the service provider 200 via the communication channel before it is executed by the service provider. In this case, the remote service may include installing, e.g. compiling, or interpreting the application code received from the client, executing the received application as a remote application on the side of the service provider, and communicating the results of the execution back to the client 100. In an SaaS architecture, the remote application is provided by the service provider itself and the remote service includes executing the remote application, potentially on input data and/or configuration data received from the client 100, and communicating the results to the client.

The communications framework used for communications between the client 100 and the service provider 200 may implement any well-known communication techniques and protocols. The communications framework may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators). The client-server architecture may include various common communications elements, such as a transmitter, receiver, transceiver, radio, network interface, baseband processor, antenna, amplifiers, filters, power supplies, and so forth. The embodiments, however, are not limited to these implementations.

The communications framework may implement various network interfaces arranged to accept, communicate, and connect to a communications network. A network interface may be regarded as a specialized form of an input/output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater speed and capacity, distributed network controller architectures may similarly be employed to pool, load balance, and otherwise increase the communication bandwidth required by clients 100 and servers 200. A communications network may be any one and the combination of wired and/or wireless networks including without limitation a direct interconnection, a secured custom connection, a private network (e.g., an enterprise intranet), a public network (e.g., the Internet), a personal area network (PAN), a local area network (LAN), a metropolitan area network (MAN), an Operating Missions as Nodes on the Internet (OMNI), a wide area network (WAN), a wireless network, a cellular network, and other communications networks.

As mentioned above, the client 100 and the server 200 may each include a device that may be any electronic device capable of receiving, processing, and sending information, e.g. through a communication component. Examples of an electronic device may include without limitation a client device, a personal digital assistant (PDA), a mobile computing device, a smart phone, a cellular telephone, ebook readers, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a network appliance, a web appliance, a distributed computing system, a multiprocessor system, a processor-based system, consumer electronics, programmable consumer electronics, a game device, a television, a set top box, a wireless access point, a base station, a subscriber station, a mobile subscriber center, a radio network controller, a router, a hub, a gateway, a bridge, a switch, a machine, or a combination thereof. The embodiments are not limited in this context.

The device may execute processing operations or logic for the one or several applications such as the exemplary client application 110 and the remote application 210, for a communications component, the operating system, in particular a kernel of the operating system, and for other software elements using one or more processing components, i.e. processing circuitry. The processing components or processing circuitry may comprise various hardware elements such as devices, logic devices, components, processors, microprocessors, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor devices, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an embodiment of the below-described disk attestation unit and/or disk sealing unit is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device may execute communications operations or logic for communications with other devices using one or more communications components. The communications components may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component may include various types of standard communication elements, such as one or more communications interfaces, network interfaces, network interface cards (NICs), radios, wireless transceivers, wired and/or wireless communication media, physical connectors, and so forth. By way of example, and not limitation, communication media include wired communications media and wireless communications media. Examples of wired communications media may include a wire, cable, metal leads, printed circuit boards (PCBs), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device may communicate with other devices over communications media using communications signals as indicated in FIG. 1, via the one or more communications components. The other devices may be internal or external to the device, as desired for a given implementation.

The device may be implemented in the form of a distributed system that may distribute portions of the above-described structure and/or operations across multiple computing entities. Examples of a distributed system may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client 100 and/or the server 200 may include a computing architecture as described in the following. In one embodiment, the computing architecture may comprise or be implemented as part of an electronic device. Examples of an electronic device may include those described above. The embodiments are not limited in this context.

As used in this application, the terms "apparatus", "component", "client", "server", "service provider", "software provider", "disk attestation unit" and "disk sealing unit" are intended to refer to a computer-related entity, either hardware, a combination of hardware and software, software, or software in execution, examples of which are provided by the exemplary computing architecture described below. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer or distributed between two or more computers. Further, components may be communicatively coupled to each other by various types of communications media to coordinate operations. The coordination may involve the uni-directional or bi-directional exchange of information as required. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture may include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by this computing architecture.

The computing architecture may comprise a processing unit, a system memory, and a system bus. The processing unit can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit.

The system bus provides an interface for system components including, but not limited to, the system memory to the processing unit. The system bus can be any of several types of bus structure that may further interconnect to a memory bus (with or without a memory controller), a peripheral bus, and a local bus using any of a variety of commercially available bus architectures. Interface adapters may connect to the system bus via a slot architecture. Example slot architectures may include without limitation accelerated graphics port (AGP), card bus, (Extended) Industry Standard Architecture ((E)ISA), micro channel architecture (MCA), NuBus, Peripheral Component Interconnect (Extended) (PCI(X)), PCI Express, Personal Computer Memory Card International Association (PCMCIA), and the like.

The computing architecture may comprise or implement a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory may include various types of computer-readable storage media in the form of one or more higher speed memory units, such as read-only memory (ROM), random-access memory (RAM), dynamic RAM (DRAM), double-data-rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as redundant array of independent disks (RAID) drives, solid state memory devices (e.g., Universal Serial Bus (USB) memory, solid-state drives (SSD)) and any other type of storage media suitable for storing information. The system memory can include non-volatile memory and/or volatile memory. A basic input/output system (BIOS) can be stored in the non-volatile memory.

The computing architecture may include various types of computer-readable storage media in the form of one or more lower speed memory units, including an internal (or external) hard disk drive (HDD), a magnetic floppy disk drive (FDD) to read from or write to a removable magnetic disk, and an optical disk drive to read from or write to a removable optical disk (e.g., a CD-ROM, DVD, or Blu-ray). The HDD, FDD and optical disk drive can be connected to the system bus by a HDD interface, an FDD interface and an optical drive interface, respectively. The HDD interface for external drive implementations can include at least one or both of USB and IEEE 1394 interface technologies.

The drives and associated computer-readable media provide volatile and/or nonvolatile storage of data, data structures, computer-executable instructions, and so forth. For example, a number of program modules can be stored in the drives and memory units, including an operating system, in particular a kernel of an operating system, one or more application programs, also called applications herein, such as the exemplary client application 110 and the exemplary remote application 210, other program modules, and program data. In one embodiment, the one or more application programs, other program modules, and program data can include, for example, the various applications and/or components to implement the disclosed embodiments.

Nonvolatile storage of data according to the present disclosure comprises storage of a disk image associated with an application to be executed inside an enclave. A disk image according to the present disclosure is a computer file containing the contents and structure of a disk volume or part of a disk or even the entire data storage device, such as the above-mentioned HDD, FDD or optical disk drive. The trusted execution environment may set aside a specific part of a disk or create a specific disk volume for each enclave such that read and/or write accesses to this part or volume are limited to the application being executed in the TEE. The disk image may, in particular, comprise configuration data and/or interpreted code, and may generally comprise input and/or output data of the application.

A user can enter commands and information into the computing device through one or more wire/wireless input devices, for example, a keyboard and a pointing device, such as a mouse. Other input devices may include microphones, infrared (IR) remote controls, RF remote controls, game pads, stylus pens, card readers, dongles, finger print readers, gloves, graphics tablets, joysticks, keyboards, retina readers, touch screens (e.g., capacitive, resistive), trackballs, trackpads, sensors, styluses, and the like. These and other input devices are often connected to the processing unit through an input device interface that is coupled to the system bus, but can be connected by other interfaces such as a parallel port, IEEE 1394 serial port, a game port, a USB port, an IR interface, and so forth.

A display may also be connected to the system bus via an interface, such as a video adaptor. The display may be internal or external to the computing device. In addition to the display, a computing device typically includes other peripheral output devices, such as speakers, printers, and so forth.

The computing device may operate in a networked environment using logical connections via wire and/or wireless communications to one or more remote computers, such as a remote device. The remote device can be a workstation, a server computer, a router, a personal computer, portable computer, microprocessor-based entertainment appliance, a peer device or other common network node, and typically includes many or all of the elements described relative to the computing architecture. The logical connections may include wire/wireless connectivity to a LAN and/or larger networks, for example, a WAN. Such LAN and WAN networking environments are commonplace in offices and companies, and facilitate enterprise-wide computer networks, such as intranets, all of which may connect to a global communications network, for example, the Internet.

When used in a LAN networking environment, the device is connected to the LAN through a wire and/or wireless communications network interface or adaptor. The adaptor can facilitate wire and/or wireless communications to the LAN, which may also include a wireless access point disposed thereon for communicating with the wireless functionality of the adaptor.

When used in a WAN networking environment, the device can include a modem, or is connected to a communications server on the WAN, or has other means for establishing communications over the WAN, such as by way of the Internet. The modem, which can be internal or external and a wire and/or wireless device, connects to the system bus via the input device interface. In a networked environment, program modules, or portions thereof, can be stored in a remote memory/storage device. It will be appreciated that the network connections are exemplary and other means of establishing a communications link between the devices can be used.

The client/server device is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi, WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect devices to each other, to the Internet, and to wire networks (which use IEEE 802.3-related media and functions).

Remote services such as remote computation as shown in FIG. 1 are inherently insecure and often subject to security leaks that may compromise the service and/or assets of a user because the remote device is owned and maintained by a generally untrusted party, the service provider. Trusted services are a relatively new concept and consequently, the number of solutions is limited.

The HTTPS protocol allows establishing a secure channel with an authenticated server. The server authentication may be based on an X.509 certificate provided by the server which is attested and signed by an a priori trusted certificate authority, in particular a root certificate authority. Even if the server can be authenticated this way and a secure channel can be established that provides confidentiality and communication integrity, the process can still be compromised by malicious software on the side of the service provider. Memory accesses to the remote application from software components at higher privilege levels than the remote application, in particular system software components including a hypervisor, also called virtual machine monitor (VMM), and the kernel of the operating system, can compromise the remote application, for instance if the respective software components include malicious software. In this case, even the setup of the secure channel, e.g. via a Transport Layer Security (TLS) client, can be compromised such that confidentiality and communication integrity cannot be guaranteed.

To resolve the issue of malicious software at higher privilege levels, the concept of a trusted execution environment was introduced. Application code for remote applications, such as a web server or a game client, running at the lowest privilege level is executed in an isolated execution environment, a so-called secure container or secure enclave. The enclave's code and data are protected by preventing even privileged system code from accessing the content of the enclave. Instead, a limited set of trusted functions is provided that may be used to access the content of the enclave.

An example of a trusted execution environment is Intel's SGX as described in detail in Victor Costan and Srinivas Devadas, "Intel SGX Explained," 2016. SGX is a set of extensions to the Intel architecture that aims to provide integrity and confidentiality guarantees to security-sensitive computation performed on a computer where all the privileged software (kernel, hypervisor, etc.) is potentially malicious. An SGX-enabled processor protects the integrity and confidentiality of the computation inside an enclave by isolating the enclave's code and data from the outside computing environment, such as the operating system and hypervisor, and hardware devices attached to the system bus. In SGX, an enclave (secure container) may only contain the private data in a computation and the code that operates on it. An application is generally built with trusted and untrusted parts where only the trusted parts are executed inside the enclave. Enclaves can work together to support distributed architectures. Enclave code and data run in the clear and enclave data written to disk is encrypted and checked for integrity.

Figure 2:
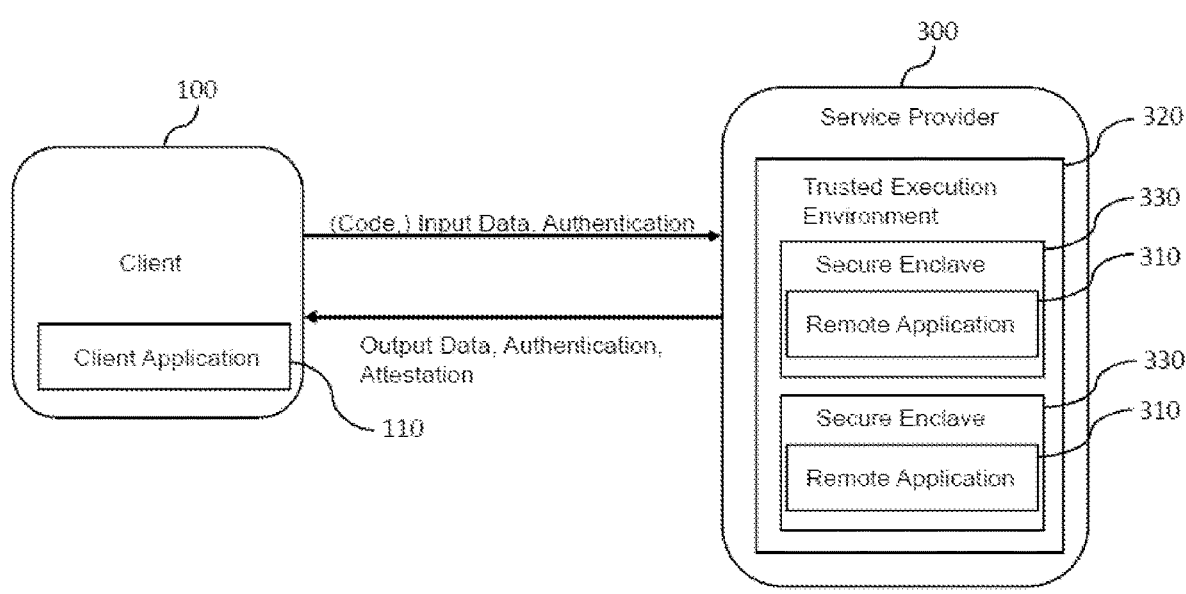
FIG. 2 schematically shows a configuration for trusted computing using secure containers.

FIG. 2 schematically shows a modified configuration of the client-server architecture of FIG. 1 for trusted computing using secure containers as described above. The service provider 300 in this configuration provides a trusted execution environment 320 in which one or more secure enclaves 330 are initialized to execute remote applications 310 that ultimately provide the remote service requested by the client 100. Each of the remote applications 310 is associated with a disk image created when setting up the corresponding enclave. For simplicity, only the trusted part of the remote applications is shown in the figures.

Figure 3:
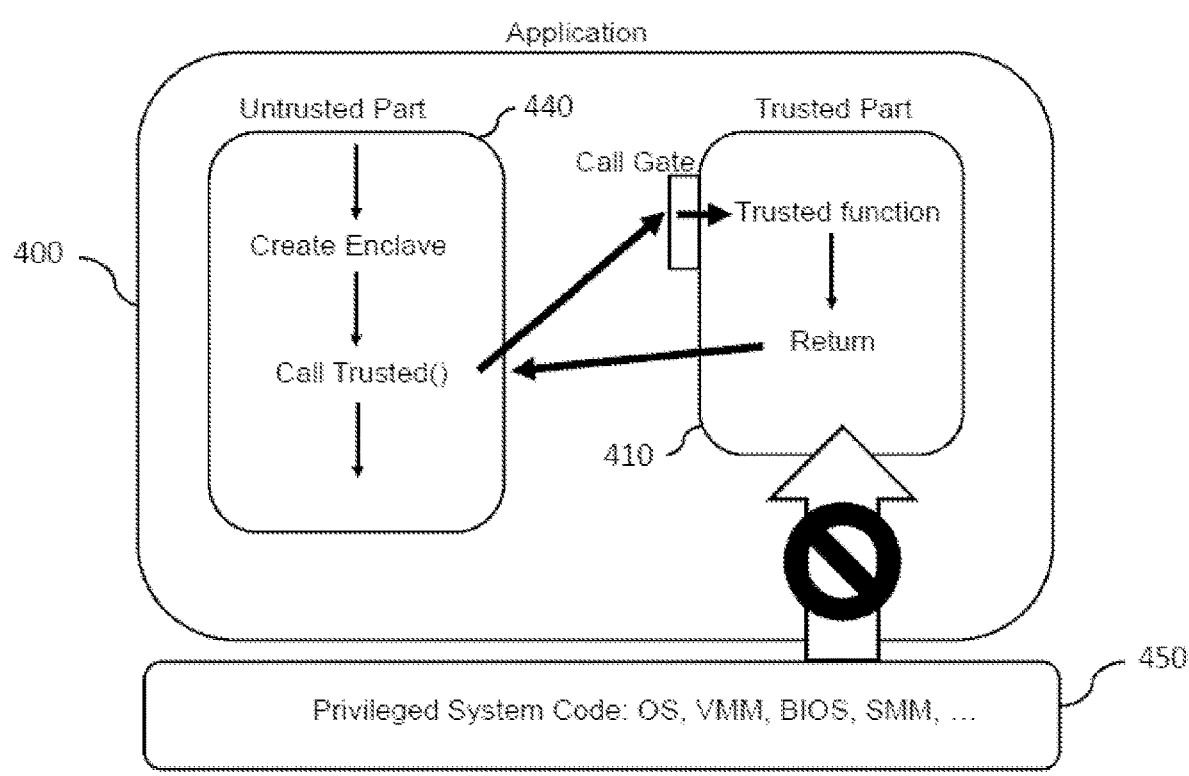
FIG. 3 illustrates the concept of runtime execution of an application in a secure container.

FIG. 3 illustrates the concept of a typical runtime execution of an application in a secure container as known in the art. First, the remote application 400 is built with trusted and untrusted parts 410 and 440, respectively. The application may be provided by the service provider 300 itself, e.g., as SaaS, or received via a secure channel from the client 100. When the (untrusted part of the) application runs, an enclave is created which is placed in the trusted memory of the processor. A trusted function is called and execution is transitioned to the enclave via a call gate. The enclave sees all process data in clear while external access to enclave data is denied. The trusted function returns enclave data and the application continues normal execution. During execution, access to the trusted part by privileged system code 450, such as the OS, a VMM, the BIOS, the System Management Mode (SMM), or the like, is blocked by the enclave. However, as described above, system calls of the trusted function, such as disk I/O or interrupts, take execution outside the enclave for performing the system call and are thus, subject to potential security issues related to the privileged system code. As described above, this issue is partially overcome by porting the LKL to Intel SGX.

In addition to the security issues related to system calls, remote computing requires a mechanism to ensure that the application itself that is executed inside the enclave can be trusted.

Like its predecessors, the Trusted Platform Model (TPM) and Trusted Execution Technology (TXT), SGX relies on software attestation to prove to a user that he/she is communicating with a specific piece of software running in a secure container hosted by the trusted hardware. The proof may be a cryptographic hash, such as SHA-1, SHA-2, SHA-256, MD4, or MD5 that certifies the hash of the secure container's contents. The service provider can load any application in a secure container but the user/client will refuse to load his data into a secure container whose contents' hash does not match the expected value. A processor and enclave-specific sealing key can be used to safely store and retrieve sensitive information that may need to be stored on disk as described in more detail further below.

An SGX enclave 330 may generate an SGX report containing a cryptographic hash of the enclave's data, e.g., the remote application 310. The service provider may further generate a linkable quote on the SGX report which may be signed by a quoting enclave (QE) (not shown) which may, in turn, generate a quote Q on the SGX report that contains the report and the cryptographic hash. The QE may be provided as a separate enclave on the side of the service provider 300. The SGX enclave 330 may request attestation of the quote Q from a third party attestation service, e.g., Intel's Attestation Service (IAS), which may reside on a remote server. The attestation response from the attestation service may be signed with a public key and may contain a copy of the quote. The service provider 300 may then send the quote, the IAS attestation report on said quote and the data as an attestation response to the client 100 that requested attestation in a corresponding attestation request. After receiving the attestation response, the client 100 may verify the validity of the quote by checking the signature on the IAS response with the public key. The client may further verify that the cryptographic hash of the data corresponds to the hash within the quote. In this manner, the data may be trusted to come directly from the sending enclave.

The cryptographic hash may be generated on any data that a remote application 310 may require to be securely handled by a secure enclave 330 of the service provider 300. The data may for instance, comprise the binary code of the application.

If the application generates a public key for establishing a secure channel between the client 100 and the secure enclave 330, the cryptographic hash of the corresponding binary code may be used by the client to verify that the public key was generated by an SGX protected application whose identity is given by the hash. The public key may be used to generate a shared secret for a secure channel between the client 100 and the secure enclave 330.

If the application is a remote application to be executed as a service, both SaaS and IaaS, the cryptographic hash may be used as an identity of the application. In this case, the client 100 is enabled to verify the identity of the application based on the attestation response.

By extending the client-server architecture of FIG. 1 with the trusted execution environment and attestation of FIG. 2, a client 100 may verify the identity of a remote application 310 executed in the trusted execution environment 320 of a service provider 300.

There is, however, a problem to determine whether execution of the application, in particular with regard to disk accesses, can be trusted. By way of example, security leaks may arise if the operating system on the remote server itself contains malicious code. Generally, a trusted function of the application may still be insecure, e.g. by including unsafe function calls outside the secure enclave. In this case, a mere verification of the application ID would not detect the security breach.

Figure 4:
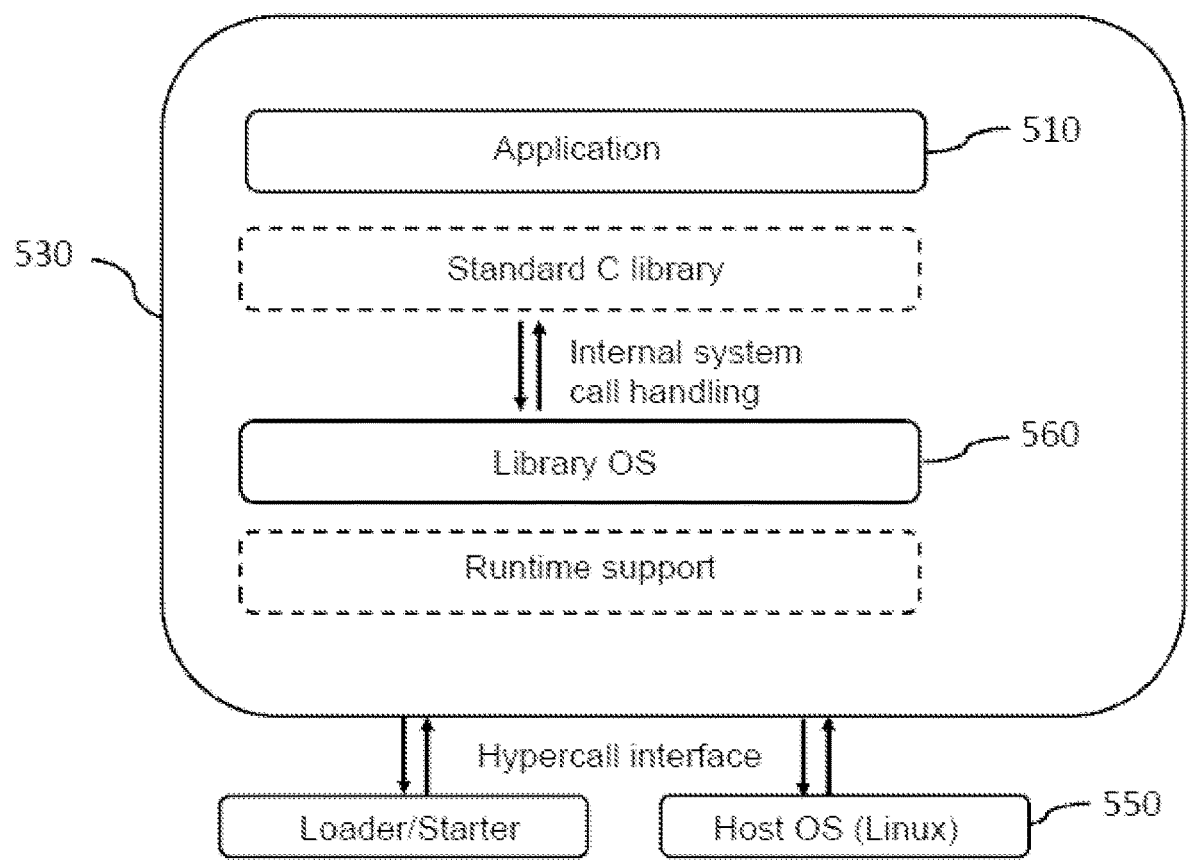
FIG. 4 illustrates the concept of an SGX-LKL enclave.

Intel SGX tries to solve this issue by adding LKL, i.e. a part of the operating system, to the trusted execution environment. FIG. 4 illustrates the concept of an SGX-LKL enclave as known in the art. By porting LKL to Intel SGX, an SGX-LKL enclave 530 instead of a simple SGX enclave is created for the execution of the application in a secure container. In addition to executing (the trusted part of) the application 510, a library of the operating system, the LKL, 560, is executed inside the enclave 530. As a result, system calls with regard to functions of the LKL 560 are handled internally to the enclave. Typical functionality of the LKL includes thread synchronization, memory management, file systems, networking, and signal handling. Furthermore, the standard C library and runtime support may be ported to Intel SGX and thus, executed inside the SGX-LKL enclave 530. Consequently, transitions to the outside of the SGX-LKL enclave can be reduced to calls to the host operating system 550 and a loader/starter that may be executed through a hypercall interface.

As the attestation of the SGX-LKL enclave 530 includes the library OS 560, security breaches due to malicious system code inside LKL functions can be avoided. However, as mentioned above, SGX-LKL enclave attestation does not include the content of a disk image associated with the application such that, in particular, interpreted code of the application and configuration files are not verified. Furthermore, as the content of the disk image is not protected, data on the disk can be exposed and/or altered without changing the identity of the corresponding SGX-LKL enclave. Even using SGX-LKL with an encrypted disk still suffers from a freshness issue that allows an attacker to make SGX-LKL execute malware on the disk that alters the SGX-LKL memory and changes its behavior.

The present disclosure solves these problems by extending SGX-LKL by two additional mechanisms, a disk attestation mechanism and a disk sealing mechanism. Disk attestation and disk sealing may be added in terms of software as modules and/or in terms of hardware as a disk attestation unit and/or a disk sealing unit of the processing circuitry as described above. The main purpose of the disk attestation according to the present disclosure is to verify the content of a disk image associated with an application before executing the application inside the SGX-LKL enclave. In other words, during attestation, the SGX-LKL will be able to prove, in addition to the authenticity of its executable, also the authenticity of the content of the disk image it is working with. The disk sealer unit ensures that only the disk which is attested by the disk attestation unit will be used and that its content will remain protected. The content of the disk image may include at least one of an executable of the application, an interpreted program of the application, execution data of the application and a configuration file of the application.

Figure 5:
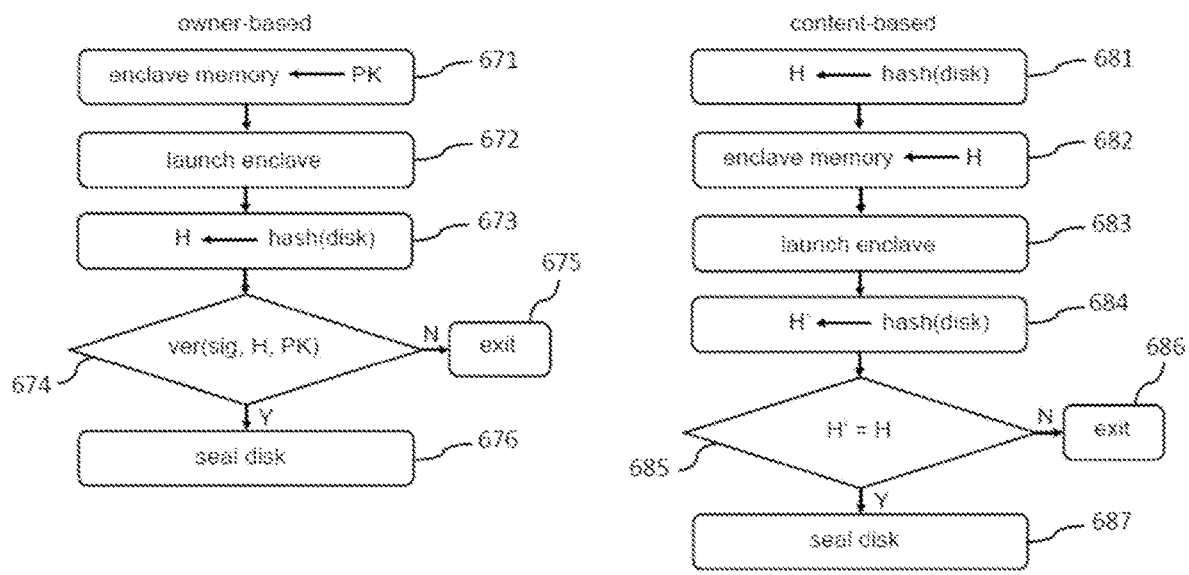
FIG. 5 shows an owner-based and a content-based disk attestation process according to the present disclosure.

FIG. 5 shows an owner-based and a content-based disk attestation process according to two embodiments of the present disclosure. Disk attestation may be integrated as a module in the initialization process of the SGX-LKL enclave. The purpose of disk attestation is to ensure that the content of the disk image can be verified during the SGX-LKL software attestation process. By implementing disk attestation according to the present disclosure, whenever an SGX-LKL enclave is challenged to prove its identity, it will attest not only the authenticity of the LKL and the application but also the authenticity of the disk image associated with the application. Two possible implementations of the disk attestation module/unit will be described in the following with reference to the left-hand and right-hand sides of FIG. 5.

According to a first embodiment of the disk attestation unit, an owner-based disk attestation process is implemented that is most applicable where an owner of the application exists that is associated with an encryption key. The purpose of the owner-based disk attestation process is to attest the integrity of the disk image as it was generated by the owner of the application.

In a first step 671 of the owner-based disk attestation, the client 100 provides a public key PK associated with the owner of the application to the service provider 300. When the functionality to create an SGX-LKL enclave is invoked, e.g. by the service provider 300 in response to a corresponding request to execute a specific application in a trusted execution environment 320, the disk attestation unit adds the public key PK to the memory of the SGX-LKL enclave before creating the enclave. Alternatively, a cryptographic hash of the public key PK may be added to the memory of the SGX-LKL enclave before initializing the enclave. The cryptographic hash may be SHA-1, SHA-2, SHA-256, MD4, MD5, or the like.

In the next step 672, the enclave is launched by creating the enclave. As the public key PK or a cryptographic hash of the public key PK was added to the memory of the SGX-LKL enclave before initializing the enclave, the enclave identity, which in Intel SGX is represented by the value of MRENCLAVE, reflects the public key as well.

In response to an attestation request by the client 100, the public key PK or its cryptographic hash may be used to attest ownership of the enclave. To this end, the attestation request may include the public key PK associated with the owner as input to the SGX-LKL enclave. Depending on whether the public key or its cryptographic hash was added to the memory of the enclave, a cryptographic hash may be calculated by the remote server for the public key PK provided with the attestation request. Verifying the identity of the enclave as part of the attestation process then includes comparing the received public key or its cryptographic hash with the public key or its cryptographic hash, respectively, as it was added to the memory of the enclave. If the received public key and the stored public key, or their respective cryptographic hashes, do not agree, the SGX-LKL enclave may automatically stop execution and report a failed verification to the client 100 in the attestation response.

Alternatively or additionally, the SGX-LKL enclave, after launch, may receive a cryptographic signature of the content of the disk image associated with the application as input to the enclave, for instance as part of the above-mentioned attestation request. The cryptographic signature may be determined by the client 100 using the private key of the owner that corresponds to the public key that was added to the memory of the enclave. The cryptographic signature may be calculated by calculating a cryptographic hash of the content of the disk image associated with the application and subsequently signing the cryptographic hash using the private key of the owner. As part of the attestation process, the remote server 300 may calculate a corresponding cryptographic hash H of the content of the disk image as associated with the SGX-LKL enclave in step 673. The received cryptographic signature sig may then be verified in step 674 using the public key PK stored in the memory of the SGX-LKL enclave or a public key PK received as input to the enclave as described above against the content of the disk image associated and used by the SGX-LKL enclave. If the cryptographic signature after processing with the public key agrees with the cryptographic hash H calculated in step 673, the procedure proceeds to step 676 wherein disk sealing is performed on the disk image as described below. If the two values do not agree, execution of the SGX-LKL enclave is stopped in step 675 and control flow exits the enclave.

Alternatively or additionally, disk attestation may be implemented according to a second embodiment as a content-based disk attestation process as shown on the right-hand side of FIG. 5. The content-based disk attestation process does not require the existence of an owner and is thus, particularly suitable for secure execution of decentralized applications that do not have an owner but still have to prove their identity.

In a first step 681 of the content-based disk attestation process, a hash, in particular a cryptographic hash, H of the content of the disk image associated with the application is calculated, either on the client side, if the disk image is provided by the client 100 to the service provider 300, or on the server side, if the application is provided by the service provider 300 as SaaS. The resulting cryptographic hash H is then added in step 682 to a memory of the SGX-LKL enclave before initializing the enclave. As a result, the identity of the enclave reflects the content of the disk image before launching the enclave in the SGX-LKL software attestation.

Subsequently, the enclave is launched in step 683 by creating the SGX-LKL enclave including the application, the LKL OS library, and the cryptographic hash H. Before sealing the disk in step 687 and performing execution of the application inside the SGX-LKL enclave, a second cryptographic hash H' is calculated for the content of the disk image that is associated with the SGX-LKL enclave to be used during execution of the SGX-LKL enclave. This calculation may be performed in response to an explicit attestation request from the client 100. As will be described in more detail below with regard to the disk sealing process shown in FIG. 6, the disk image to be used during execution of the SGX-LKL enclave may be a duplicate of the disk image originally associated with the SGX-LKL enclave.

In step 685, it is determined whether the cryptographic hashes H and H' are identical. If this is the case, the procedure proceeds to step 687 wherein disk sealing is performed on the disk image as described below. If, however, the two cryptographic hashes do not agree, execution of the SGX-LKL enclave is stopped in step 686 and control flow exits the enclave.

Finally, the software attestation process according to the present disclosure stops execution of the application upon failure of the verification of the identity of the enclave, independent of the reason for the failure of the verification of the identity. Consequently, in addition to detecting a rogue application, a change in owner and/or a change to the disk image are detected by the software attestation according to the present disclosure.

Figure 6:
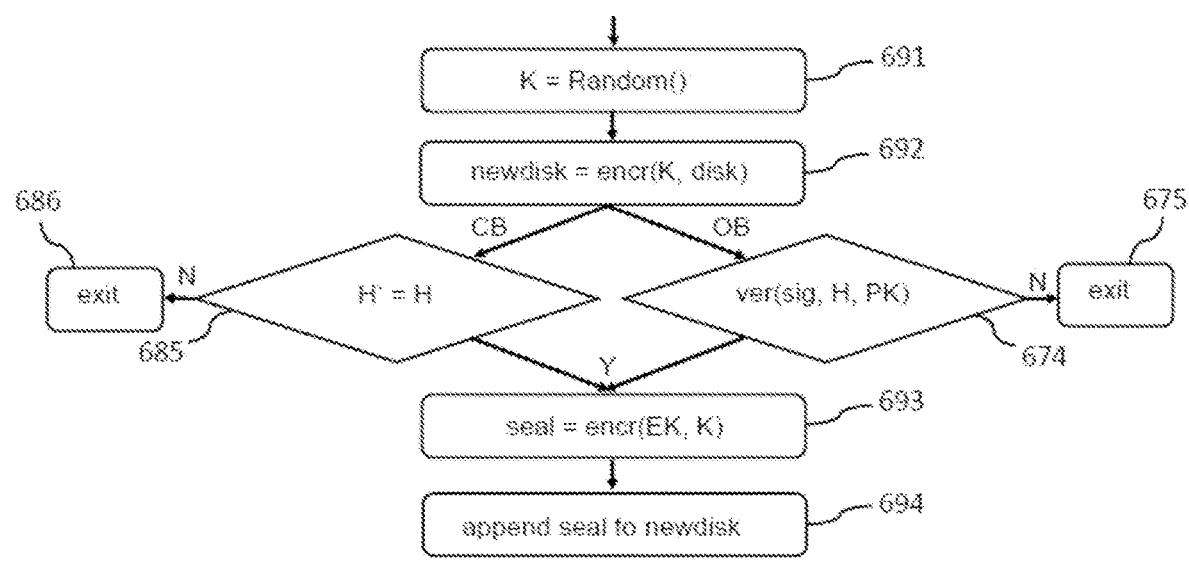
FIG. 6 shows a disk sealing process according to the present disclosure.

FIG. 6 shows a disk sealing process according to the present disclosure. The purpose of the disk sealing process is to protect the content of the disk image during execution of the application and to ensure that the content of the disk image matches the attestation method invoked by the above described disk attestation unit.

At the beginning of the enclave execution, i.e. after launching the enclave in step 672 or 683, a random encryption key K is generated on the remote server 300 in step 691.

As mentioned above, generation of the random encryption key K can be performed as part of a disk sealing module or by a dedicated disk sealing unit of the processing circuitry. Next, the disk image associated with the SGX-LKL enclave after launching the enclave is read and a cryptographic hash of the content of the disk image is calculated as shown in step 673 and 684 of FIG. 5. Subsequently, a duplicate version new disk of the disk image is created in step 692 of the disk sealing process which is encrypted using the random encryption key K.

Depending on whether a content-based (CB) disk attestation or an owner-based (OB) disk attestation is performed, it is determined in step 685 whether the cryptographic hash H' calculated for the content of the disk image associated with the SGX-LKL enclave, i.e. after launching the enclave, is identical to the cryptographic hash H of the content of the disk image associated with the application and inserted into the memory of the enclave before initialization, or the cryptographic signature sig provided as input to the SGX-LKL enclave is verified in step 674 using the public key PK against the cryptographic hash H calculated for the content of the disk image associated with the SGX-LKL enclave. As described above, failure of the verification will lead to an immediate stop of the execution in steps 686 and 675, respectively. As the encryption key K was randomly generated, any new execution of the SGX-LKL enclave will not be able to use the encrypted disk. Consequently, an attacker starting a new instance of the SGX-LKL enclave will not have access to the encrypted disk.

If the verification of the hash succeeds, the disk sealing unit encrypts the random encryption key K with an encryption key EK, such as a sealing key, of the SGX-LKL enclave in step 693 and stores the result in the duplicate of the disk image in step 694. The encrypted random encryption key may be appended to the duplicate of the disk image as a seal. Appending the encrypted random encryption key to the duplicate of the disk image may be done using LKL functionality. Storing the encrypted random encryption key in the duplicate of the disk image ensures that the encrypted disk image can be used in further executions or instances of the SGX-LKL enclave. As the encryption key EK of the SGX-LKL enclave is the same for all instances of the SGX-LKL enclave with the same identity, the encrypted disk image may be used by other instances of the SGX-LKL enclave, for instance in a distributed execution environment, by decrypting the random encryption key appended to the encrypted disk image and using the random encryption key to decrypt the disk image.

As the encrypted random encryption key is added to the encrypted disk image only if the above described disk attestation process is successful, the disk sealing mechanism according to the present disclosure guarantees that only the disk image which is attested by the disk attestation unit will be used by the SGX-LKL enclave. Encryption of the disk image using the random encryption key and encrypting the random encryption key using an enclave-specific encryption key EK ensures that only the SGX-LKL enclave with the encryption key EK and further instances of this enclave with the same identity can access and modify the disk image. The disk sealing mechanism therefore provides both confidentiality and integrity to the disk image associated with the application and further guarantees freshness with regard to the SGX-LKL enclave due to the use of a random encryption key.

Finally, the disk sealing unit may redirect all disk access from the SGX-LKL enclave to the encrypted duplicate of the disk image. Consequently, the above described attack relying on an SGX-LKL execution with a disk image encrypted with a key of an attacker that is provided to the SGX-LKL enclave will be unsuccessful as the corrupted SGX-LKL enclave does not have access to the encrypted duplicate of the disk image associated with the correct SGX-LKL enclave.

The above-described extensions to SGX-LKL using disk attestation and disk sealing ensure that software attestation not only covers the executable but also the content of an associated disk image. Furthermore, the described disk sealing makes it difficult for an attacker to modify and corrupt a disk image associated with an application executed in a secure container. The present disclosure provides a library OS that runs in SGX and can prove the authenticity of the content of the disk image it uses as well as encrypt the disk image. The disclosed methods for attesting the content of a disk image may be based on an owner's signature and/or the content of the disk image. Furthermore, a method for sealing a disk image after attesting the authenticity of its content is described.

What is claimed is:

1. An apparatus comprising:
   a memory configured to store instructions; and
   one or more processors coupled to the memory and configured to execute the instructions to:
     initialize an enclave in a trusted execution environment (TEE), wherein the enclave comprises an operating system (OS) library;
     execute an application inside the enclave using the OS library, wherein the application is associated with a disk image; and
     perform software attestation to verify an identity of the enclave,
     wherein the software attestation comprises attestation of content of the disk image.

2. The apparatus of claim 1, wherein the content comprises an executable of the application, an interpreted program of the application, execution data of the application, or a configuration file of the application.

3. The apparatus of claim 1, wherein the one or more processors are further configured to execute the instructions to add a first public key or a first cryptographic hash of the first public key to an enclave memory of the enclave before initializing the enclave.

4. The apparatus of claim 3, wherein the one or more processors are further configured to execute the instructions to receive a second public key as input to the enclave, and wherein verifying the identity of the enclave comprises verifying the second public key or a second cryptographic hash of the second public key against the first public key or the first cryptographic hash.

5. The apparatus of claim 4, wherein the one or more processors are further configured to execute the instructions to stop execution of the application upon failure to verify the identity.

6. The apparatus of claim 3, wherein the one or more processors are further configured to execute the instructions to receive a cryptographic signature of the content as input to the enclave, and wherein verifying the identity of the enclave comprises verifying the content using the first public key and the cryptographic signature.

7. The apparatus of claim 3, wherein the one or more processors are further configured to execute the instructions to:
   generate a random encryption key;
   read the disk image; and create a duplicate of the disk image by encrypting the disk image with the random encryption key before executing the application.

8. The apparatus of claim 7, wherein the one or more processors are further configured to execute the instructions to:

encrypt, using a sealing key of the enclave and after succeeding to verify the identity, the random encryption key to obtain an encrypted random encryption key; and add the encrypted random encryption key to the duplicate.

9. The apparatus of claim 8, wherein the one or more processors are further configured to execute the instructions to redirect all disk access calls of the OS library during execution of the application to the duplicate.

10. The apparatus of claim 1, wherein the one or more processors are further configured to execute the instructions to:

apply a cryptographic hash function to the content of the disk image to obtain a cryptographic hash; and add the cryptographic hash to an enclave memory of the enclave before initializing the enclave.

11. The apparatus of claim 10, wherein verifying the identity of the enclave comprises verifying the content using the cryptographic hash.

12. A method comprising:

initializing an enclave in a trusted execution environment (TEE), wherein the enclave comprises an operating system (OS) library;

executing an application inside the enclave using the OS library, wherein the application is associated with a disk image; and performing software attestation to verify an identity of the enclave, wherein the software attestation comprises attestation of content of the disk image.

13. The method of claim 12, wherein the content comprises an executable of the application, an interpreted program of the application, execution data of the application, or a configuration file of the application.

14. The method of claim 12, further comprising:

receiving a second public key as input to the enclave, wherein verifying the identity of the enclave comprises verifying the second public key or a second cryptographic hash of the second public key against a first public key or a first cryptographic hash of the first public key; or receiving a cryptographic signature of the content as the input, wherein verifying the identity of the enclave comprises verifying the content using the first public key and the cryptographic signature.

15. The method of claim 12, further comprising:
generating a random encryption key;
reading the disk image;
creating a duplicate of the disk image by encrypting the disk image with the random encryption key before executing the application;
encrypting, using a sealing key of the enclave and after succeeding to verify the identity, the random encryption key to obtain an encrypted random encryption key; and adding the encrypted random encryption key to the duplicate.

16. The method of claim 12, further comprising:

applying a cryptographic hash function to the content of the disk image to obtain a cryptographic hash; and adding the cryptographic hash to an enclave memory of the enclave before initializing the enclave, wherein verifying the identity of the enclave comprises verifying the content using the cryptographic hash.

17. A computer program product comprising instructions that are stored on a non-transitory computer-readable medium and that, when executed by one or more processors, cause an apparatus to:

initialize an enclave in a trusted execution environment (TEE), wherein the enclave comprises an operating system (OS) library;

execute an application inside the enclave using the OS library, wherein the application is associated with a disk image; and perform software attestation to verify an identity of the enclave, wherein the software attestation comprises attestation of content of the disk image.

18. The computer program product of claim 17, wherein the instructions, when executed by the one or more processors, further cause the apparatus to:

receive a second public key as input to the enclave, wherein verifying the identity of the enclave comprises verifying the second public key or a second cryptographic hash of the second public key against a first public key or a first cryptographic hash of the first public key; or receive a cryptographic signature of the content as the input, wherein verifying the identity of the enclave comprises verifying the content using the first public key and the cryptographic signature.

19. The computer program product of claim 17, wherein the instructions, when executed by the one or more processors, further cause the apparatus to:

generate a random encryption key;
read the disk image;
create a duplicate of the disk image by encrypting the disk image with the random encryption key before executing the application;
encrypt, using a sealing key of the enclave and after succeeding to verify the identity, the random encryption key to obtain an encrypted random encryption key; and
add the encrypted random encryption key to the duplicate.

20. The computer program product of claim 17, wherein the instructions, when executed by the one or more processors, further cause the apparatus to:

apply a cryptographic hash function to the content of the disk image to obtain a cryptographic hash; and add the cryptographic hash to an enclave memory of the enclave before initializing the enclave, wherein verifying the identity of the enclave comprises verifying the content using the cryptographic hash.

* * * * *